United States Patent [19]

Caunt et al.

[11] 4,252,670

[45] Feb. 24, 1981

[54] OLEFINE POLYMERIZATION CATALYST

[75] Inventors: Anthony D. Caunt, Welwyn Garden City; Paul D. Gavens, Lower Stondon, both of England

[73] Assignee: Imperial Chemical Industries Limited, London, England

[21] Appl. No.: 24,085

[22] Filed: Mar. 26, 1979

[30] Foreign Application Priority Data

Jan. 10, 1979 [GB] United Kingdom ............ 00941/79

[51] Int. Cl.³ .............................................. C08F 4/64
[52] U.S. Cl. ................................. 252/429 B; 526/125; 526/127; 526/128; 526/137; 526/139; 526/140; 526/141; 526/142; 526/143; 526/144
[58] Field of Search ................................... 252/429 B

[56] References Cited

U.S. PATENT DOCUMENTS

| | | | |
|---|---|---|---|
| 3,121,064 | 2/1964 | Patat et al. | 252/429 B |
| 3,499,882 | 3/1970 | Nudenberg et al. | 252/429 B X |
| 3,549,717 | 12/1970 | Itakura et al. | 252/429 B X |
| 3,878,124 | 4/1975 | Durand et al. | 252/429 B |
| 4,115,319 | 9/1978 | Scata et al. | 252/429 B |

FOREIGN PATENT DOCUMENTS 1286867 8/1972 United Kingdom .
2015009 9/1979 United Kingdom .

*Primary Examiner*—Patrick Garvin
*Attorney, Agent, or Firm*—Cushman, Darby & Cushman

[57] ABSTRACT

A component of a polymerization catalyst is prepared by reacting an organo-magnesium compound, or a complex with an organo-aluminium compound, with an halogenating agent such as silicon tetrachloride or hydrogen chloride, and then reacting the product with a Lewis Base compound, particularly an ester and finally with titanium tetrachloride. The product obtained is combined with an organo-aluminium compound preferably together with a Lewis Base and used to polymerize an olefine monomer. The catalyst has a high activity and is stereospecific.

14 Claims, 1 Drawing Figure

A    $MgR_2$

B    $MgR_2 \cdot aAlR_3$

C    $MgR_2 + aAlR_3$

D    $R^1_b SiX_{(4-b)}$

E    $R^2COX$

F    $R^3X_c$

G    $R^4COOR^5$

H    $CH_2=CHR^6.$

OLEFINE POLYMERIZATION CATALYST

The present invention relates to a process for the production of a component of an olefine polymerisation catalyst, polymerisation catalysts including the component thus obtained and an olefine polymerisation process using such catalysts.

Olefine monomers, such as ethylene, propylene and the higher alpha-olefines, can be polymerised using the so-called Ziegler-Natta catalysts. The term "Ziegler-Natta catalyst" is generally used to mean a catalyst system obtained from a compound of a transition metal of Groups IVA to VIA of the Periodic Table together with an organo-metallic compound of a non-transition metal of Groups IA to IIIA of the Periodic Table. Using such catalysts, propylene and the higher alpha-olefines are polymerised to form a mixture of isotactic and atactic polymer, the isotactic polymer being the commercially desirable material. The polymer formed also contains catalyst residues and hitherto these have been present in such proportions that it has been necessary to treat the polymer to reduce the level of such residues.

There have been many proposals to improve the activity and/or stereospecificity of the catalyst system. Such proposals include the use of additional catalyst components, typically Lewis Base compounds, or the modification of one or other or both of the components of the catalyst system. According to one such proposal the transition metal compound is supported on a divalent metal halide which is typically magnesium chloride.

According to the present invention there is provided a process for the production of a composition suitable for use as a component of an olefine polymerisation catalyst, which process comprises treating a magnesium hydrocarbyl compound, or a complex or mixture of a magnesium hydrocarbyl compound and an aluminium hydrocarbyl compound, with at least one halogenating agent, adding to the reaction product a Lewis Base compound, and then adding titanium tetrachloride.

The treatment with at least one halogenating agent is conveniently carried out by treating a liquid medium which contains the magnesium hydrocarbyl compound or the complex or mixture of the magnesium hydrocarbyl compound and an aluminium hydrocarbyl compound with the halogenating agent. The liquid medium is conveniently a solution of the magnesium hydrocarbyl compound or the mixture or complex of the magnesium hydrocarbyl compound and the aluminium hydrocarbyl compound in an inert liquid such as a hydrocarbon liquid, for example hexane, heptane, octane, decane, dodecane or mixtures of the isomers thereof, an inert halohydrocarbon such as chlorobenzene.

The formulae A-H in the Drawing represent the compounds used in this invention.

The magnesium hydrocarbyl compound is a compound of formula (A) in the attached formula drawings. The complex of the magnesium hydrocarbyl compound with the aluminium hydrocarbyl compound is represented by formula (B) in the attached formula drawings. The mixture of the magnesium hydrocarbyl compound with the aluminium hydrocarbyl compound is represented by formula (C) in the attached formula drawings.

In the formula (A), (B) and (C), each R, which may be the same or different, is a hydrocarbyl group, typically an alkyl group, conveniently an alkyl group containing from 1 up to 20 carbon atoms, especially 1 up to 6 carbon atoms; and a has a value up to 2, typically 0.05 up to 1.0.

It will be appreciated that the compounds of formulae (B) and (C) may be present together as an equilibrium mixture and indeed such a mixture can be obtained merely by mixing together the magnesium hydrocarbyl compound with the aluminium hydrocarbyl compound when the resulting product will be a mixture of magnesium hydrocarbyl compound, the aluminium hydrocarbyl compound and the complex of formula (B). It will be appreciated that it is preferred that the compound of formula (A), (B) or (C) is a material which is soluble in inert liquid hydrocarbons.

The at least one halogenating agent, which is not a titanium tetrahalide, is preferably a chlorinating agent. Suitable halogenating agents include hydrogen halides such as hydrogen chloride, silicon halides of the formula (D) in the attached formula drawings, carboxylic acid halides of the formula (E) in the attached formula drawings, hydrocarbyl halides of the formula (F) in the attached formula drawings, phosphorus pentachloride, thionyl chloride, sulphuryl chloride phosgene, nitrosyl chloride, halides of mineral acids, chlorine, bromine, chlorinated polysiloxanes, hydrocarbyl aluminium halides, aluminium chloride and ammonium hexafluorosilicate, wherein $R^1$ is hydrogen or a hydrocarbyl group, preferably an alkyl group containing 1 up to 6 carbon atoms or an aryl, alkaryl or aralkyl group containing 6 up to 15 carbon atoms;

$R^2$ is a hydrocarbyl group, preferably an alkyl group containing 1 up to 4 carbon atoms or an aryl, alkaryl or aralkyl group containing 6 up to 12 carbon atoms;

$R^3$ is a hydrocarbyl residue;

X is as hereinbefore defined;

b is 0 or an integer from 1 up to 3; and c is an integer from 1 up to 10.

The silicon halides of formula (D) include silicon tetrachloride, silicon tetrabromide and halosilanes such as trimethyl silicon monochloride, diethyl silicon dichloride and monobutyl silicon trichloride.

The carboxylic acid halides of formula (E) include acetyl chloride, benzoyl chloride and p-methylbenzoyl chloride.

The hydrocarbyl halides of formula (F) include carbon tetrachloride, chloroform, ethyl chloride, ethylene dichloride and 1,1,1-trichloroethane.

Halides of mineral acids include boron trichloride and antimony pentachloride.

Hydrocarbyl aluminium halides include diethyl aluminium chloride and monoethyl aluminium dichloride.

The quantity of the at least one halogenating agent is conveniently sufficient to provide at least 0.1, and especially at least 1.0, halogen atom for every group R present in the compound of formula (A), (B) or (C). The treatment can be effected at ambient temperature or at an elevated temperature of up to 100° C. The preferred temperature is dependent on the particular halogenating agent used, for example, using silicon tetrachloride, the temperature is preferably at least 60° C. The treatment is conveniently carried out by adding one reagent, for example the compound of formula (A), (B) or (C), to a stirred solution containing the other reagent, for example the at least one halogenating agent. Using a gaseous halogenating agent such as hydrogen chloride, the gas can be passed into the reaction medium until no further absorption is observed to occur. The treatment of the compound of formula (A), (B) or (C) with the at least one halogenating agent is conveniently effected for a time of at least 0.25 up to 10 hours, preferably from 1 up to 5 hours.

The product of treating the compound (A), (B) or (C) with the at least one halogenating agent is a solid product which contains a magnesium halide composition which is deficient in halogen atoms, that is it contains less than two halogen atoms for each magnesium. This solid product typically has an X-ray diffraction spectrum which includes relatively broad lines corresponding to lattice spacings at about 11 Å, 5.8 Å, 2.8 Å and 1.8 Å, with a broad halo extending from 3.1 Å up to 2.7 Å. This material also has a high specific surface area which is typically at least 100 m$^2$/gramme. The term "specific surface area" as used herein is the surface area of 1 gramme of the solid product, the surface area having been measured using the technique of BS 4359/1. The specific surface area may be as high as 150 m$^2$/gramme or even 200 m$^2$/gramme or higher.

After the treatment of the compounds of formulae (A), (B) and (C) with the at least one halogenating agent, the solid reaction product is conveniently separated from the reaction medium and washed several times.

A Lewis Base compound is then added to the product of treating the compound of formula (A), (B) or (C) with the at least one halogenating agent. This is conveniently effected by adding the Lewis Base compound to a suspension, in an inert liquid medium such as an inert liquid hydrocarbon or halohydrocarbon, of the product of treating the compound of formula (A), (B) or (C) with the at least one halogenating agent. The quantity of Lewis Base used is conveniently in an amount of up to 1 mole of Lewis Base compound for each gramme atom of magnesium which is present in the reaction product. Preferred quantities of the Lewis Base compound are from 0.1 up to 0.8 mole for each gramme atom of magnesium and especially at least 0.5 up to 0.8 mole for each gramme atom of magnesium.

The addition of the Lewis Base compound to the reaction product may be effected at temperatures of from 0° C. up to 100° C. and is very conveniently carried out at ambient temperature, that is from about 15° C. up to about 30° C. After adding the Lewis Base compound to the reaction product, the materials are conveniently allowed to remain in contact for 0.1 up to 70 hours, especially 1 up to 20 hours.

The Lewis Base compound can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, a thioether, a thioester, a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an alkanolamine, an amine, a cyclic amine such as pyridine or quinoline, a diamine such as tetramethylethylenediamine or an organo-phosphorus compound such as an organo-phosphine, an organo-phosphine oxide, an organo-phosphite or an organo-phosphate. The use of organo Lewis Base compounds is disclosed, inter alia, in British Pat. Nos. 803,198; 809,717; 880,998; 896,509; 920,118; 921,954; 933,236; 940,125; 966,025; 969,074; 971,248; 1,013,363; 1,017,977; 1,049,723; 1,122,010; 1,150,845; 1,208,815; 1,234,657; 1,324,173; 1,359,328; 1,383,207; 1,423,658; 1,423,659 and 1,423,660.

Preferred Lewis Base compounds are esters which may be represented by the formula (G) given in the attached formula drawings.

In the formula (G),
$R^4$ is a hydrocarbyl group which may be substituted by one or more halogen atoms and/or hydrocarbyloxy groups; and
$R^5$ is a hydrocarbyl group which may be substituted by one or more halogen atoms.

The groups $R^4$ and $R^5$ may be the same or different. The group $R^4$ is conveniently an alkyl or aryl group, for example a methyl, ethyl, phenyl or tolyl group. The group $R^5$ is preferably an alkyl group containing up to 6 carbon atoms, for example an ethyl or a butyl group. It is particularly preferred that $R^4$ is an aryl group and $R^5$ is an alkyl group.

After the Lewis Base compound and the reaction product have remained in contact for the desired period of time, the product thus formed is conveniently separated from the reaction medium and washed with an inert liquid.

Titanium tetrachloride is then added to the product of adding the Lewis Base compound to the product of treating the compound of formula (A), (B) or (C) with the at least one halogenating agent. This addition may be effected by adding a solution of titanium tetrachloride to the solid reaction product from the previous stage but is conveniently carried out by suspending the solid reaction product in undiluted titanium tetrachloride. The amount of titanium tetrachloride is preferably in a molar excess relative to the magnesium present in the solid material. The addition is conveniently carried out at a temperature from 0° C. up to the boiling temperature of titanium tetrachloride which is about 137° C. at atmospheric pressure. Preferably the addition is carried out at a temperature of from 60° C. up to 120° C. especially 75° C. to 100° C. After adding the titanium tetrachloride to the solid, the materials are conveniently allowed to remain in contact for from 0.25 up to 10 hours, preferably 1 up to 5 hours.

After the desired period of contacting, the product obtained is separated from the unreacted titanium tetrachloride and washed several times with an inert liquid medium.

The product may be separated and washed between each stage of the reaction but it should be appreciated that it is not necessary to do this at all stages of the process.

The product obtained contains a titanium compound supported on a magnesium halide composition. This product may be used as one component of an olefine polymerisation catalyst.

More specifically as a further aspect of the present invention there is provided an olefine polymerisation catalyst which comprises
 (1) the reaction product obtained by the process of the present invention; and
 (2) an organic compound of a metal of Group IIA of the Periodic Table or of aluminium or a complex of an organo-metallic compound of a metal of Group IA or Group IIA of the Periodic Table with an organic compound of aluminium.

Component (2) of the catalyst can be a Grignard reagent, preferably one which is substantially ether-free, or can be a compound of formula (A) or (B) in the attached formula drawings. If the component (2) is a complex of a metal of Group IA with an organo-aluminium compound, this compond may be of the type lithium aluminium tetraalkyl. It is preferred that the component (2) is an organo-aluminium compound which may be an aluminium hydrocarbyl halide such as a dihydrocarbyl aluminium halide, an aluminium hydrocarbyl sulphate, or an aluminium hydrocarbyl hydrocarbyloxy but is preferably an aluminium trihydrocarbyl or a dihydrocarbyl aluminium hydride. The aluminium trihydrocarbyl is preferably an aluminium trialkyl in which the alkyl group contains from 1 up to 4 carbon atoms and is particularly an ethyl group.

Using an aluminium trihydrocarbyl as component (2) it is preferred that the catalyst system also includes a Lewis Base compound. The Lewis Base compound can be any Lewis Base compound of the type disclosed for the production of component (1) of the catalyst system. However, preferred Lewis Base compounds are esters of formula (G). Esters of anisic acid (4-methoxybenzoic acid) are particularly preferred as the Lewis Base component of the catalyst system.

In addition to, or instead of, the Lewis Base compounds, the catalyst system may also include a substituted or unsubstituted polyene, which may be an acyclic polyene such as 3-methylheptatriene(1,4,6), or a cyclic polyene such as cyclooctatriene, cyclooctatetraene, or cycloheptatriene or the alkyl- or alkoxy-substituted derivatives of such cyclic polyenes, tropylium salts or complexes, tropolone or tropone.

The proportions of components (1) and (2) of the catalyst system can be varied within a wide range as is well known to the skilled worker. The particular preferred proportions will be dependent on the type of materials used and the absolute concentrations of the components but in general we prefer that for each gramme atom of titanium which is present in component (1) of the catalyst system there is present at least 1 mole of component (2) and preferably at least 5 moles of component (2) for each gramme atom of titanium. The number of moles of component (2) for each gramme atom of titanium in component (1) may be as high as 1000 and conveniently does not exceed 500.

When the catalyst system includes a Lewis Base component in addition to component (2), it is preferred that the Lewis Base compound is present in an amount of not more than 1 mole for each mole of component (2) and particularly from 0.1 up to .5 mole of the Lewis Base compound for each mole of the component (2). However, depending on the particular organo-metallic compound and Lewis Base compound, the proportion of the Lewis Base compound may need to be varied to achieve the optimum catalyst system.

If the catalyst system includes a polyene, it is preferred that the polyene is present in an amount of not more than one mole for each mole of component (2), and especially from 0.01 up to 0.20 mole for each mole of component (2). If the catalyst system includes both a Lewis Base component and a polyene, it is preferred that both of these materials are together present in an amount of not more than one mole for each mole of component (2).

Catalysts in accordance with the present invention can be used to polyermise or copolymerise olefine monomers.

Thus, as a further aspect of the present invention there is provided an olefine polymerisation process which comprises contacting, under polymerisation conditions, at least one olefine monomer with a catalyst in accordance with the present invention.

The olefine monomer which may be contacted with the catalyst system is one having the formula (H) as set out in the accompanying formula drawings.

In the formula (H), $R^6$ is a hydrogen atom or an alkyl radical.

Thus, the olefine may be ethylene, propylene, butene-1, pentene-1, hexene-1, 4-methylpentane-1 or any other olefine which satisfies formula (H). The olefine monomer is preferably one containing not more than 10 carbon atoms. The olefine monomers may be homopolymerised or may be copolymerised together. If propylene is copolymerised it is preferred to effect the copolymerisation with ethylene conveniently using a sequential copolymerisation process as is described in British Pat. Nos. 970,478; 970,479 and 1,014,944. If ethylene is being copolymerised using the process of the present invention, it is preferred to carry out the copolymerisation using a mixture of ethylene and the desired comonomer, for example butene-1 or hexene-1, wherein the mixture of monomers has essentially the same composition throughout the polymerisation process.

It has been found that the process of the present invention can be used for the polymerisation of propylene to give a relatively low proportion of the undesirable soluble polymer and also a high yield of polymer relative to the amount of titanium which is present in component (1) of the catalyst system.

It is preferred to mix component 1 of the catalyst with the other component or components in the presence of the monomer. If the catalyst includes a Lewis Base compound, it is preferred to premix the organo-metallic compound which is component (2) with the Lewis Base compound. This pre-mixture and the reaction product which is component (1) are then mixed together.

As is well known, Ziegler-Natta type catalysts are susceptible to the presence of impurities in the polymerisation system. Accordingly, it is desirable to effect the polymerisation using a monomer, and a diluent if this is being used, which has a high degree of purity, for example a monomer which contains less than 5 ppm by weight of water and less than 1 ppm by weight of oxygen. Materials having a high degree of purity can be obtained by processes such as those described in British Pat. Nos. 1,111,493; 1,226,659 and 1,383,611.

Polymerisation can be carried out in the known manner, for example in the presence or absence of an inert diluent such as a suitably purified paraffinic hydrocarbon, in the liquid phase using an excess of the liquid monomer as the polymerisation medium or in gas phase, this latter term being used herein to mean the essential absence of a liquid medium.

If polymerisation is effected in gas phase, it may be effected by introducing the monomer, for example propylene, into the polymerisation vessel as a liquid and operating with conditions of temperature and pressure within the polymerisation vessel which is such that the liquid monomer vaporises, thereby giving an evaporative cooling effect, and essentially all of the polymerisation occurs with a gaseous monomer. Polymerisation in gas phase is preferably effected using conditions which are such that the monomer is at a temperature and partial pressure which are close to the dew point temperature and pressure for that monomer. Such a procedure is described in more detail in published German patent application No. 2,616,356. Polymerisation in gas phase can be effected using any technique suitable for effecting a gas-solid reaction such as a fluidised-bed reactor system, a stirred-bed reactor system or a ribbon blender type of reactor.

Polymerisation may be effected either in a batch manner or on a continuous basis. The catalyst components may be introduced into the polymerisation vessel separately or all the catalyst components may be mixed together before being introduced into the polymerisation reactor. It will be appreciated that any premixing of all the catalyst components is preferably effected in the presence of a monomer and such premixing will result in polymerisation of this monomer before the catalyst system is introduced into the polymerisation vessel. The polymerisation can be effected in the presence of a chain transfer agent such as hydrogen or a zinc dialkyl, in order to control the molecular weight of the product formed. If hydrogen is used as the chain transfer agent, it is conveniently used in an amount of from 0.01 up to 5.0%, particularly from 0.05 up to 2.0% molar relative to the monomer. The amount of chain transfer agent will be dependent on the polymerisation conditions, especially the temperature, which, at polymerisation pressures not exceeding 50 kg/cm$^2$, is typically in the range from 20° C. up to 100° C., preferably from 50° up to 85° C.

Polymerisation can be effected at any pressure which has been previously proposed for effecting the polymerisation of olefine monomers. However, although the polymerisation may be effected at pressures up to 3000 Kg/cm$^2$, at which pressures the polymerisation temperature may be as high as 260° C., it is preferred to carry out the polymerisation at relatively low pressures. Whilst the polymerisation may be effected at atmospheric pressure, it is preferred to use a slightly elevated pressure and thus it is preferred that the polymerisation is effected at a pressure of from 1 Kg/cm$^2$ up to 50 Kg/cm$^2$, preferably from 5 up to 30 Kg/cm$^2$.

Using catalysts in accordance with the present invention ethylene or propylene may be polymerised to give polymers having desirable properties. Thus, propylene may be polymerised to give a polymer having a high flexural modulus. Ethylene copolymers with alpha-olefine comonomers such as butene-1 or hexene-1, may also be obtained using the catalysts in accordance with the present invention and these polymers have a desirable combination of characteristics.

Various aspects of the present invention will now be described with reference to the following Examples which are illustrative of the invention. In the Examples, all operations are effected under an atmosphere of nitrogen unless otherwise indicated.

EXAMPLE 1

(A) Reaction of magnesium aluminium butyl with silicon tetrachloride 50 cm$^3$ of a solution of magnesium aluminium butyl in hexane (the solution was 0.74 molar with respect to magnesium dibutyl and 0.34 molar with respect to aluminium tributyl) were slowly added to 20 cm$^3$ of silicon tetrachloride in a 300 cm$^3$ reaction vessel provided with a sintered glass frit, and a stirrer. A faint white precipitate was obtained. The solution was then heated to reflux, maintained at that temperature for 4 hours and a dense white precipitate was formed. The precipitate was filtered off and washed three times using 100 cm$^3$ aliquots of n-heptane for each wash. The solid was dried in nitrogen at a pressure of 0.2 mm of mercury and at ambient temperature. The product contained less than 1% molar of aluminium chloride and was deficient in chlorine by an amount of 6.1%.

(B) Reaction with Lewis Base compound (ethyl benzoate)

The magnesium chloride containing product of the preceding step was suspended in 100 cm$^3$ of n-heptane. To this suspension was added ethyl benzoate in a proportion of 20% molar with respect to the magnesium. The mixture was stirred at ambient temperature (about 20° C.) for a period of 28 hours. At the end of this time the n-heptane solvent was removed under vacuum (0.2 mm of mercury) at ambient temperature.

(C) Reaction with titanium tetrachloride

The product of step (B) was then mixed with 100 cm$^3$ of undiluted titanium tetrachloride. The mixture was heated to 120° C. and stirred for 4 hours. The mixture was then cooled to 80° C., filtered, and then washed at 80° C. three times using 100 cm$^3$ of n-heptane for each wash. This material was finally suspended in 100 cm$^3$ of n-heptane.

EXAMPLE 2

(A) Reaction of magnesium dibutyl with silicon tetrachloride 21 cm$^3$ of a 0.56 M solution of magnesium dibutyl (an equimolar mixture of primary, and secondary, dibutyl magnesium) in an isoparaffin fraction essentially all of which had a boiling temperature in the range from 117° C. to 135° C., were placed in a reaction vessel as used in Example 1. To the magnesium dibutyl solution were added 60 cm$^3$ of silicon tetrachloride. The mixture was stirred at ambient temperature (about 20° C.) for 60 hours and was then heated up to 80° C. and stirred at that temperature for a further 3 hours. The solid material formed was allowed to settle and the liquid was filtered off. The solid was then washed three times using 100 cm$^3$ of n-heptane for each wash. The solid was then suspended in a further 100 cm$^3$ of n-heptane.

(B) Treatment with Lewis Base (ethyl benzoate)

To the suspension of the magnesium chloride containing product obtained in step (A), was added ethyl benzoate in an amount of 0.7 mole relative to the magnesium content of the solid. The mixture was stirred for 16 hours at ambient temperature (about 20° C.). The solid was allowed to settle and the liquid was filtered off. The solid was then washed twice with 100 cm$^3$ of heptane for each wash.

(C) Treatment with titanium tetrachloride

The solid obtained in step (B) was suspended in 100 cm$^3$ of titanium tetrachloride and the mixture was stirred at 80° C. for two hours. The liquid was then filtered off and the solid product was washed four times using 100 cm$^3$ n-heptane at 80° C. for each wash. The solid material obtained contained 0.19 milligramme atoms of titanium for each gramme of the solid. The solid was suspended in 100 cm$^3$ of n-heptane.

EXAMPLE 3

The procedure of Example 2 was repeated with the exception that in step (b) the quantity of ethyl benzoate used was in an amount sufficient to provide 0.15 mole of ethyl benzoate for each mole of magnesium present in the solid.

EXAMPLE 4

The procedure of Example 2 was repeated with the exception that in step (A) once the silicon tetrachloride had been added the mixture was heated immediately to 80° C. and maintained at this temperature for 3 hours and then filtered and washed.

EXAMPLE 5

(A) Reaction of magnesium butyls with hydrogen chloride

Into a three-necked flask of capacity 250 cm$^3$ were placed 70 cm$^3$ of dry n-heptane. To the flask was then added 17.9 cm$^3$ of a solution, in n-heptane, containing an equimolar mixture of primary and secondary dibutyl magnesiums, the solution containing 10 milligramme atoms of magnesium. The contents of the flask were stirred and 100 cm$^3$ of dry hydrogen chloride were added. The addition of hydrogen chloride was repeated three further times, each addition being 5 minutes ater the previous addition. After the addition of four 100 cm$^3$ portions of hydrogen chloride, the reaction mixture was stirred at ambient temperature (about 20° C.) for a further hour. At this stage a further 100 cm$^3$ of hydrogen chloride were added (making a total of 20 millimoles of hydrogen chloride).

Immediately after the completion of the final addition of hydrogen chloride, the product was allowed to settle and was then washed four times by decantation using 100 cm$^3$ of n-heptane for each wash. The solid material obtained was finally resuspended in 100 cm$^3$ of n-heptane.

(B) Treatment with ethyl benzoate

To the suspension obtained in stage (A), were added 1 cm$^3$ of ethyl benzoate and 80 cm$^3$ of n-heptane. The mixture was stirred overnight (about 16 hours) at ambient temperature (about 20° C.). A further 100 cm$^3$ of heptane were added and then the mixture was filtered. The solid residue was washed once with 100 cm$^3$ of n-heptane.

(C) Treatment with titanium tetrachloride

The solid residue obtained from step (B) was mixed with 100 cm$^3$ of neat titanium tetrachloride and the mixture was heated at 80° C. for a time of 2 hours. The solid product was then filtered and was washed four times at 80° C. using 100 cm$^3$ of n-heptane for each wash. The product obtained was finally slurried in 50 cm$^3$ of n-heptane.

By analysis it was found that 5 cm$^3$ of the suspension contained 0.01 millimole Ti, 0.58 millimole Mg and 1.7 millimoles Cl.

COMPARATIVE EXAMPLE A

The procedure of Example 2 was repeated with the exception that instead of effecting stage (A) of the procedure a magnesium chloride material was used. This magnesium chloride was a commercially available product which had then been ball-milled in a Megapact vibration mill (manufactured by PILAMEC of Gloucestershire, England) of internal diameter 3.8 cm and length 56 cm. 50 g of magnesium chloride were milled using 110 stainless steel balls of 12.7 mm diameter and 1700 stainless steel balls of 6.35 mm diameter, a milling time of 48 hours, using a milling frequency of 2800 oscillations per minute and an amplitude of 2 mm.

COMPARATIVE EXAMPLE B 5 g (3.3 cm$^3$) of silicon tetrachloride, 0.9 cm$^3$ of ethyl benzoate and 5 cm$^3$ of n-heptane were mixed in a reaction vessel as described in Example 1. To this mixture, which was being stirred, were added, over a period of 10 minutes, 50 cm$^3$ of the mixed magnesium dibutyl solution used in step (A) of Example 2. The mixture was heated to 90° C. and maintained at that temperature for 2 hours. A further 3.3 cm$^3$ of silicon tetrachloride were added and stirring at 90° C. was continued for a further 2 hours. The mixture, which contained a precipitate, was then allowed to cool to ambient temperature, the precipitate was filtered off and washed three times at ambient temperature using 100 cm$^3$ of n-heptane for each wash.

To the solid were added 55 cm$^3$ of titanium tetrachloride, the mixture was refluxed for 2 hours and then filtered without cooling. A further 55 cm$^3$ of titanium tetrachloride were added, the mixture was refluxed for 1 hour and again filtered without cooling. A further 55 cm$^3$ of titanium tetrachloride were added, the mixture was refluxed for 1 hour, filtered without cooling, cooled to ambient temperature and washed four times at ambient temperature using 100 cm$^3$ of an aliphatic hydrocarbon fraction consisting mainly of pentamethylheptane isomers and having a boiling point in the range 170° C. up to 180° C.

The solid was then suspended in 100 cm$^3$ of the pentamethylheptane fraction.

COMPARATIVE EXAMPLE C 82 cm$^3$ of dry n-heptane, 58 cm$^3$ of silicon tetrachloride and 1.1 cm$^3$ of ethyl benzoate were mixed in a reaction vessel as described in Example 1. The mixture was stirred and 21 cm$^3$ of the mixed magnesium dibutyl solution of step (A) of Example 2 were added over a period of 10 minutes. Stirring was continued at ambient temperature for 60 hours, then the mixture was heated to 80° C. and maintained at that temperature for 3 hours.

The mixture, which contained a precipitate, was allowed to cool to ambient temperature, the precipitate was filtered off and washed three times at ambient temperature using 100 cm$^3$ of n-heptane for each wash.

100 cm$^3$ of titanium tetrachloride were added to the solid residue, the mixture was stirred, heated up to 80° C. and maintained, with stirring, at that temperature for 3 hours. The mixture was then filtered without cooling and the solid was washed four times using 100 cm$^3$ of n-heptane at 80° C. for each wash.

The solid was then suspended in 100 cm$^3$ of n-heptane.

COMPARATIVE EXAMPLE D

Into a reaction vessel as described in Example 1 were placed 13.1 g of magnesium ethoxide (supplied by Alfa Ventron of Massachusetts, USA), 100 cm$^3$ of dry n-heptane and 50 cm$^3$ of silicon tetrachloride. The mixture was stirred at ambient temperature for 16 hours, heated to 80° C. and this temperature was maintained for 3 hours. After cooling to ambient temperature the solid was filtered and washed three times at ambient temperature with 100 cm$^3$ of n-heptane for each wash. Ethyl benzoate (0.2 mole per gramme atom of magnesium present) and 100 cm$^3$ of n-heptane were added, the mixture was stirred at ambient temperature for 16 hours, filtered and washed three times at ambient temperature with 100 cm$^3$ of n-heptane for each wash. 100 cm³ of titanium tetrachloride were added, the mixture was stirred, heated to 80° C. and maintained at that temperature for 4 hours. The solid was then filtered off without cooling and washed four times with 100 cm³ of n-heptane at 80° C. for each wash. The solid was finally suspended in 100 cm³ of n-heptane.

COMPARATIVE EXAMPLE E

Comparative Example D was repeated with the exception that 0.7 mole of ethyl benzoate per gramme atom of magnesium present was used, all other conditions being the same.

COMPARATIVE EXAMPLE F

Into a reaction vessel as described in Example 1 were placed 15.7 g of magnesium ethoxide (as used in Comparative Example D) and 100 cm³ of dry n-heptane and the mixture was stirred. Ethyl benzoate (0.2 mole per gramme atom of magnesium present) and 60 cm³ of silicon tetrachloride were added. The mixture was stirred at ambient temperature for 16 hours, heated to 80° C., and maintained at 80° C. for 3 hours. The mixture was allowed to cool to ambient temperature, the mixture was filtered and washed three times at ambient temperature, with 100 cm³ of n-heptane for each wash. 100 cm³ of titanium tetrachloride were added, the mixture was stirred, heated to 80° C. and maintained at that temperature for 4 hours. The mixture was filtered without cooling and washed four times using 100 cm³ of n-heptane at 80° C. for each wash. The solid was finally suspended in 100 cm³ of n-heptane.

COMPARATIVE EXAMPLE G

Comparative Example F was repeated with the exception that 0.7 mole of ethyl benzoate per gramme atom of magnesium present was used, all other conditions being the same.

EXAMPLES 6 TO 10

The products of Examples 1 to 5 and Comparative Examples A to G were used to polymerise propylene using the following procedure.

The propylene used for the polymerisation had been purified by passing gaseous propylene in turn through a column (7.6 cm diameter, 90 cm length) containing 1.58 mm granules of 'Alcoa' F1 alumina at 50°–60° C., and then through a similar column containing BTS catalyst (cupric oxide reduced to finely divided metallic copper on a magnesium oxide support) at 40°–50° C., condensing the issue gas and passing the liquid propylene through four columns (all 7.6 cm diameter; two of 90 cm in length, two of 1.8 m in length) at 25° C., each containing 1.58 mm pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene, etc.) was unchanged at <1 ppm.

Into a 2 liter glass flask having three necks, was placed 1 liter of the pentamethylheptane fraction. This liquid was vigorously stirred and was first purged with nitrogen at 60° C. and then the flask was evacuated, which treatment effectively reduced the water and oxygen contents of the pentamethylheptane fraction to below 10 ppm by weight.

Whilst still stirring the pentamethylheptane fraction and maintaining the temperature at 60° C., the pentamethylheptane fraction was saturated with the purified propylene. To this mixture was then added 8 millimoles of triethyl aluminium and then 3 millimoles of ethyl anisate, both as a solution in pentamethylheptane. Finally between 5 cm³ and 10 cm³ of a suspension from one of the Examples 1 to 5 or the Comparative Examples A to G were added. Polymerisation was continued for a period of 2 hours at 60° C. whilst maintaining a pressure of 1 atmosphere by the addition of further propylene. At the end of 2 hours, the polymerisation was terminated by the addition of 10 cm³ of isopropanol and an aliquot portion of the diluent was taken and the proportion of polymer dissolved in this aliquot was determined by evaporation to dryness. The polymer was filtered, washed three times with 200 cm³ of petrol ether for each wash and dried in an oven at 0.1 mm of mercury pressure and 120° C. From the yield of polymer obtained the conversion of polymer for each millimole of titanium present in the catalyst could be determined.

The results obtained are set out in the Table.

TABLE

| Example or Comparative Example | Ti Compound Type | Ti Compound Amount (mM) (a) | Yield g/mM (b) | Wt % Diluent Soluble Polymer (c) |
|---|---|---|---|---|
| 6 | 1 | 0.2 | 280 | 3.48 |
| 7 | 2 | 0.035 | 330 | 0.86 |
| 8 | 3 | 0.069 | 325 | 2.05 |
| 9 | 4 | 0.083 | 483 | 1.5 |
| 10 | 5 | 0.01 | 628 | 1.2 |
| H | A | 1.18 | 4 | 0.74 |
| I | B | 0.051 | 272 | 6.84 |
| J | C | 0.056 | 31.9 | 4.76 |
| K | D | 0.405 | 18.8 | 1.19 |
| L | E | 1.52 | 10.6 | 11.5 |
| M | F | 0.555 | 33.0 | 1.85 |
| N | G | 0.296 | 10.5 | 0.5 |

Notes to Table
(a) Amount is given as mM of titanium contained in the product of Examples 1 to 5 or the Comparative Examples.
(b) Yield is expressed in grammes of total polymer (solid + soluble) obtained for each milligramme atom of titanium added in the Example or Comparative Example.
(c) Given by the relationship
$$\frac{Wt \text{ of diluent soluble polymer} \times 100}{Wt \text{ of total polymer}}$$

We claim:
1. A process for the production of a composition suitable for use as a component of an olefine polymerisation catalyst, which process comprises treating a magnesium hydrocarbyl compound, or a complex or mixture of a magnesium hydrocarbyl compound and an aluminium hydrocarbyl compound, with at least one halogenating agent, adding to the reaction product a Lewis Base compound, and then adding titanium tetrachloride.

2. The process of claim 1 wherein the treatment with the at least one halogenating agent is carried out by treating a liquid medium which contains the magnesium hydrocarbyl compound or the complex or mixture of the magnesium hydrocarbyl compound and an aluminium hydrocarbyl compound with the halogenating agent.

3. The process of claim 1 wherein the magnesium hydrocarbyl compound or the mixture or complex thereof with an aluminium hydrocarbyl is selected from compounds of the formulae
    (A) $MgR_2$;

(B) MgR$_2$aAlR$_3$; and
(C) MgR$_2$+aAlR$_3$
where
  each R, which may be the same or different, is a hydrocarbyl group; and
  a has a value up to 2.

4. The process of claim 1 wherein the at least one halogenating agent, which is not a titanium tetrahalide, is a hydrogen halide, a silicon halide of the formula $$R_b^1SiX_{(4-b)},$$

a carboxylic acid halide of the formula $$R^2COX,$$

a hydrocarbyl halide of the formula $$R^3X_c,$$

phosphorus pentachloride, thionyl chloride, sulphuryl chloride, phosgene, nitrosyl chloride, a halide of mineral acid, chlorine, bromine, a chlorinated polysiloxane, a hydrocarbyl aluminium halide, aluminium chloride or ammonium hexafluorosilicate, wherein
  R$^1$ is hydrogen or a hydrocarbyl group;
  R$^2$ is a hydrocarbyl group;
  R$^3$ is a hydrocarbyl residue;
  X is as a halogen atom;
  b is 0 or an integer from 1 up to 3; and
  c is an integer from 1 up to 10.

5. The process of claim 3 wherein the quantity of the at least one halogenating agent is sufficient to provide at least 0.1 halogen atom for every group R present in the compound of formula (A), (B) or (C).

6. The process of claim 1 wherein the Lewis Base is an ester of the formula $$R^4COOR^5$$

wherein
  R$^4$ is an aryl group which may be substituted by one or more hydrocarbyloxy groups; and
  R$^5$ is an alkyl group.

7. The process of claim 1 wherein the Lewis Base is used in an amount of from 0.1 up to 0.8 mole for each gramme atom of magnesium which is present in the reaction product.

8. The process of claim 1 wherein the amount of titanium tetrachloride is in molar excess relative to the magnesium present in the solid material.

9. The process of claim 1 wherein the product is separated and washed between each stage of the reaction.

10. An olefine polymerisation catalyst which comprises
  (1) the reaction product obtained by the process of claim 1; and
  (2) an organic compound of a metal of Group IIA of the Periodic Table or of aluminium or a complex of an organo-metallic compound of a metal of Group IA or Group IIA of the Periodic Table with an organic compound of aluminium.

11. The catalyst of claim 10 wherein component (2) is an aluminium trihydrocarbyl compound and the catalyst also includes an ester of the formula $$R^4COOR^5$$

wherein
  R$^4$ is an aryl group which may be substituted by one or more hydrocarbyloxy groups; and
  R$^5$ is an alkyl group.

12. The process of claim 1, wherein said Lewis Base compound is an organic Lewis Base which affects either the activity or stereospecificity of a Ziegler polymerisation catalyst system.

13. The process of claim 4, wherein said Lewis Base compound is an organic Lewis Base which affects either the activity or stereospecificity of a Ziegler polymerisation catalyst system.

14. The process of claim 13, wherein said Lewis Base compound is selected from the group consisting of an ether, an ester, a ketone, an alcohol, a thioether, a thioester, a thioketone, a thiol, a sulphone, a sulphonamide, a fused ring compound containing a heterocyclic sulphur atom, an organo-silicon compound, an amide, urea and the substituted derivatives thereof, thiourea, an alkanolamine, an amine, a cyclic amine a diamine and an organo-phosphorus compound.

* * * * *